United States Patent [19]

Baxter-Smallwood et al.

[11] 3,915,992

[45] Oct. 28, 1975

[54] PROCESS FOR THE PREPARATION OF ESTERS OF DL-2-AMINO-2-ARYLACETIC ACIDS

[75] Inventors: John Christopher Baxter-Smallwood, Ulverston; Albert Roy Cooksey, Torver, near Coniston; Lewis Walton Townson, Ulverston; Derek Walker, Westmorland, all of England

[73] Assignee: Glaxo Laboratories Limited, Greenford, England

[22] Filed: Jan. 28, 1972

[21] Appl. No.: 221,810

[30] Foreign Application Priority Data

Jan. 29, 1971  United Kingdom................ 3523/71

[52] U.S. Cl.... 260/332.2 A; 260/471 A; 260/518 R; 260/518 A; 260/519; 260/521 A
[51] Int. Cl............................................ C07c 63/54
[58] Field of Search................ 260/332.2 A, 471 A

[56] References Cited
OTHER PUBLICATIONS

Forster, et al., *J. Prakt. Chemie*, Band 311, 1969, pp. 370–378.

Stieger, *Organic Syntheses*, Coll. Vol. III, 1955, pp. 91–93.

Fieser, et al., *Advanced Organic Chemistry*, (Reinhold, New York, 1961), pp. 372–374.

Pinchas, et al., Arkiv. Kemi, 22(33), 451–467, (1964).

*Primary Examiner*—Henry B. Jiles
*Assistant Examiner*—C. M. S. Jaisle
*Attorney, Agent, or Firm*—Bacon & Thomas

[57] ABSTRACT

A process for the preparation of esters of DL-2-amino-2-arylacetic acids in which a 2-arylacetic acid ester is nitrosated and then, without separation of the individual nitrosation products, reduced to yield the desired DL-2-amino-2-arylacetic acid ester.

2-Amino-2-arylacetic acids, and more particularly D-2-amino-2-phenylacetic acid, are valuable intermediates in the synthesis of anti-biotics of the penicillin and cephalosporin types. The present invention provides a relatively cheap, high yield process for the preparation of esters of DL-2-amino-2-arylacetic acids and also, by a modification, for the preparation of the acids themselves. The process is described and exemplified.

24 Claims, No Drawings

PROCESS FOR THE PREPARATION OF ESTERS OF DL-2-AMINO-2-ARYLACETIC ACIDS

This invention relates to a process the preparation of esters of DL-2-amino-2-arylacetic acids.

2-Amino-2-arylacetic acids, and more particularly D-2-amino-2-phenylacetic acid, are valuable intermediates in the synthesis of anti-biotics of the penicillin and cephalosporin types, for example, 6β-(D-2-amino-2-phenylacetamido)-penicillanic acid (ampicillin), 6β-(D-2-amino-2-p-hydroxy-phenylacetamido-penicillanic acid (amoxycillin) 6β-(D-2-amino-2-m-hydroxyphenylacetamido)-penicillanic acid, 7β-(D-2-amino-2-phenylacetamido)-3-methylceph-3-em-4-carboxylic acid (cephalexin) and 3-acetoxymethyl-7β-(D-2-amino-2-phenylacetamido)-ceph-3-em-4-carboxylic acid (cephaloglycin).

The methods used at present for manufacturing D-2-amino-2-arylacetic acids, such as D-2-amino-2-phenylacetic acid, are such that the product in spite of being made in large quantities is relatively expensive. The high cost is due largely to the low overall yields in the Strecker-type processes currently used and to the high price of some of the reagents employed in the production operation. Thus, overall yields by existing production processes are only of the order of 30–40%. In addition, carboxylic acids such as DL-2-amino-2-phenylacetic acid produced in these processes can only easily be resolved with strong acids, the expensive d-10-camphorsulphonic acid being particularly favoured for this operation. A further major drawback of such processes arises from the need to use, and dispose of, large quantities of sodium cyanide. Though it is often the practice to oxidise cyanide in process effluent to the somewhat less toxic cyanate, disposal of this effluent still presents a considerable pollution hazard.

From the above it is clear that there is need for a more economical process for producing D-2-amino-2-phenylacetic acid and other D-2-amino-2-arylacetic acids and preferably for one which avoids pollution of the environment.

We have now found that it is possible to convert the readily available esters of 2-arylacetic acids into esters of DL-2-amino-2-arylacetic acids in high yield. Such esters are attractive inputs to resolution processes leading to the desired D-2-amino-2-arylacetic acids since their higher basicity allows the use of relatively cheap optically acitive carboxylic acids as resolving agents. This new process avoids the use of cyanide completely; indeed, by recycling side fractions and solvents and by careful choice of reagents for the synthesis the new process is largely free of pollution difficulties. Furthermore, the new process is applicable to the preparation of esters of a broad class of substituted DL-2-amino-2-arylacetic acids.

Our new method uses as starting material 2-arylacetic acid esters such as 2-phenylacetic acid esters, some of which are available in large quantities as waste by-products from the production of semi-synthetic penicillin and cephalosporin antibiotics such as ampicillin and cephalexin from fermentation derived penicillin G. In the production of such antibiotics from penicillin G, a key step is N-dephenylacetylation. British Pat. No. 1189022 describes inter alia the N-dephenylacetylation of an ester of penicillin G, for example a silyl ester, whereby the acylamino side chain is cleaved with a reagent such as phosphorus pentachloride to yield an imidochloride which reacts with an alcohol such as methanol to give an iminoether which on cleavage by hydrolysis or alcoholysis gives the free 6-amino compound; the 6-amino compound is then reacylated to give the desired semi-synthetic antibiotic. A by-product of the N-dephenylacetylation reaction is an ester of 2-phenylacetic acid, the particular ester depending upon the alcohol used in the conversion of the imidochloride into the iminoether.

Belgian Pat. Nos. 747,118, 747,119 and 747,120 describe the important ring expansion step by which, for example an ester sulphoxide of penicillin G is converted into a cephalosporin. Such a cephalosporin may then be N-dephenylacetylated following the sequence just described. See British Pat. Nos. 1,227,014, 1,239,814 and 1,241,655. The free 7-amino cephalosporin thus formed is then reacylated to give as the ultimate final product a semi-synthetic cephalosporin antibiotic such as cephalexin. If methanol is used in the N-dephenylacetylation set of reactions, a by-product will be methyl pehnylacetate, an important starting material for the process of this invention. This ester may be subjected to nitrosation at the 2-carbon atom followed by reduction of the nitroso or the oxime group so introduced to an amino group. The DL-2-amino-2-phenylacetic acid ester may be subjected to resolution and hydrolysis to give D(−)-phenylglycine which can then be used to make cephalexin.

It has been shown that nitrosation of a 2- monosubstituted acetic acid ester can be effected by reaction with an alkyl nitrite and an alkali metal alkoxide in an aprotic solvent but that this method gives only a 14–34% yield of the corresponding α-oximinocarboxylic acid ester (Förster et al.; J. Prakt. Chemie. 1969, 311, 370–377).

The above publication stresses that an aprotic solvent should be used and carries a statement that in methanol no reaction took place. This finding agrees with that of earlier workers (Wislicenus and Grutzner, Berichte, 1909, 42 1930–1940; Tammelin and Flormark, Acta Chem. Scand. 1961, 15 1207) that an aprotic solvent, e.g. ether, was essential. Surprisingly, we have now found that reaction with a nitrite in the presence of base in fact gives good yields if a polar protic organic solvent, such as a primary alcohol is present. The use of such alcohols also represents an operational convenience in handling the reaction products.

Förster et al. in the above publication refer to elimination of the ester group of the α-oximino product as being responsible for the low yields they obtained. However, we haave found that the yield of DL-2-amino-2-arylacetic ester is greatly improved if the reaction product of the nitrosation step is reduced without separation of the nitrosation products into their individual components. This suggests that statements in the prior art that the low yields are due to elimination of the ester group, are possibly untrue. While we do not wish to be bound by theoretical considerations, it would appear that other nitrosated by-products are formed without elimination of the ester group and these, on reduction, in fact give the same end product, namely the desired α-amino ester. Thus, the mixture of reaction products from the nitrosation step, whether effected with or without a plar protic solvent, should desirably be reduced without separation of the ester products, although it may be convenient to remove excess reagents and solvents.

According to the present invention, therefore, we provide a process for the production of esters of DL-2-amino-2-arylacetic acids whereby a 2-arylacetic acid ester is subjected to nitrosation followed, without separation of the individual nitrosation products, by reduction to yield the desired DL-2-amino-2-arylacetic acid ester.

Nitrosation

In the first stage of our new method, a 2-arylacetic acid ester is nitrosated, preferably using an organic nitrosating agent in the presence of a base, to yield a 2-nitrosated arylacetic product reducible to the corresponding 2-amino ester.

The base used is desirably an alkali metal derivative such as an alkoxide, amide or silylamide derivative; for example, a sodium or potassium alkoxide such as sodium methoxide, ethoxide, isopropoxide or n-butoxide; sodamide, sodium diisopropylamide or sodium bistrimethyl silylamide. The alkyl groups of the above alkoxides may carry substituents such as aryl groups, as in alkali metal benzyloxides or phenethoxides. Unsubstituted alkali metal alkoxides are the most preferred bases.

The base selected is preferably soluble in the solvent system utilised.

According to a modification of the process of the invention, the ester may be hydrolised after the nitrosation step without separation of the individual nitrosated products to effect virtually complete conversion to acid or acids which acid material is then subjected to reduction as described for the esters. Such hydrolysis can be effected by the methods conventional for ester hydrolysis, e.g. treatment with bases such as alkali metal hydroxides, e.g. sodium hydroxide in the presence of water and preferably in the absence of alcohol or alcoholates; in some cases, water can simply be added to the crude nitrosation mixture.

2-Amino-2-arylacetic acids can themselves be used in the preparation of antibiotics and can, of course, be re-esterified in high yield, if desired.

The organic nitrosating reagent is suitably an alkyl, cycloalkyl, aryl or aralkyl nitrite, preferably an alkyl nitrite having 1–5 carbon atoms such as methyl, isopropyl, butyl or amyl nitrite, which may if desired be prepared in situ by the reaction of the corresponding hydroxy compound with a reagent of the formula NOY, where Y is an eliminable substituent such as a halogen atom e.g., Cl or Br, or the group $HSO_4$.

The nitrosation medium may comprise one or more organic solvents and/or an excess of the organic nitrite. Conveniently, a hydrocarbon such as a light petroleum, toluene or benzene, and/or an ether such as diethyl ether or dioxan can be used as reaction medium. This reaction medium is chosen so that optimal solubility for the starting materials is obtained and in general a mixture of solvents is required. The solvents used should naturally be liquid at the temperature selected for the reaction which can, for example, be from −50° to +150°C.

The nitrosating reagent should desirably be present in excess, and we have found it especially advantageous to use the reagent as the main reaction medium. Where other solvents are used a ratio from 1.5 to 3 moles of the reagent to each mole of arylacetic ester is desirable; higher ratios are limited merely by economic considerations. The base used should desirably be present in a ratio of 1 to 2 moles per mole of arylacetic ester.

As indicated, it is convenient to incorporate a polar protic organic solvent and this is advantageously a hydroxylic organic compound such as an alcohol, preferably a lower alcohol, having 1–6 carbon atoms such as methanol, ethanol, isopropanol or n-butanol or an aralkanol such as benzyl alcohol. Where an alkoxide is used as base, as is preferred, it is conveniently formed by dissolution of the alkali metal in an excess of the alcohol which solution may then be incorporated in the reaction medium. It is possible to use an alkoxide of an alcohol different from that used as protic solvent, but there is a possibility of transesterification between the arylacetic ester and any alcohols present. It is advantageous, therefore, when using an alcohol and/or an alkoxide, that the alkyl groups in those substances and also in the ester starting material, should be identical. However, the nitrite reactant is preferably a relatively high boiling compound such as isopropyl nitrite and in practice it is found that methyl phenylacetate can be reacted with isopropylnitrite in the presence of alkali metal methoxide in methanol to yield predominantly methyl ester products with relatively little isopropyl ester material.

In the mixture of reaction products, any oxime esters will normally be present as salts. The free esters can however be liberated from their metal salts in situ by addition of acid followed by removal of precipitated alkali metal salt or alternatively the solvent can be evaporated and the residue slurried with the desired hydrogenation solvent, particularly, where an excess of organic nitrite has been used, and liberation of the oxime-ester can take place at this stage.

Reduction

The reduction can be brought about particularly effectively by hydrogen and a catalyst, e.g. a noble metal catalyst such as palladium preferably supported on barium sulphate, calcium carbonate or, more preferably, carbon; or rhodium or platinum on carbon. Palladium catalysts are particularly preferred.

The solvent for the reduction may, for example, be any liquid inert to the reducing agent, for example, an alkanol (preferably having 1–6 carbon atoms) such as ethanol or methanol or an ester such as ethyl or butyl acetate. In hydrogenation reactions in alcohol solvents, substantial transesterification can take place. It may be preferable, therefore, to use an alcohol as solvent which corresponds to the ester material to be reduced.

For reduction by hydrogenation, oxime groups present are preferably in their protonated form =NOH and the metal-oxime salt initially produced in the presence of base is preferably converted into free oxime by acidification before reduction is effected. Conveniently, acidification is preferably effected without the addition to the system of significant amounts of water so that the metal salts can be precipitated from solution and can be filtered off. Thus, for example, inorganic acids such as hydrogen chloride gas, concentrated phosphoric acid or sulphuric acid decahydrate are conveniently used. Alternatively, anhydrous organic acids such as glacial acetic acid can be used. Acidification can be effected on the reaction mixture of the nitrosation or on a solution of the products prepared by stripping the original solvent amd excess nitrite and re-dissolving in a solvent chosen for the reduction stage. Hydrogenation is effected more rapidly when effected under pressure.

The DL-2-amino-2-arylacetic acid ester produced can be isolated by acidification to yield an insoluble acid addition salt, e.g. a hydrochloride. The ester is then conveniently used in the next purification. Thus, for example, where D-2-amino-2-arylacetic acids are required, the ester can be resolved directly, before hydrolysis to the amino acid or alternatively the DL-2-amino-2-arylacetic acid can be prepared by hydrolysis of the ester in the usual way and resolved subsequently.

The starting material for the nitrosation reaction may be any suitable 2-arylacetic ester. Conveniently, therefore, the 2-arylacetic ester is an ester of a monoarylacetic acid of the general formula

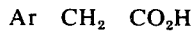

$$Ar \quad CH_2 \quad CO_2H$$

where Ar represents an aryl group, preferably having up to 20 carbon atoms, for example, a phenyl, hydroxyphenyl or thienyl group.

The ester is preferably derived from an alcohol or phenol providing as the esterifying group an alkyl, cycloalkyl, aryl or aralkyl group, preferably having 1–20 carbon atoms.

As stated earlier, particularly useful starting materials are the readily available phenylacetic esters, especially lower alkyl esters having 1–6 carbon atoms in the esterifying group which may if desired carry one or more hydroxy groups, e.g. methyl phenylacetate which is produced in large quantities as a by-product of the process for producing cephalexin from penicillin G and thus provides a highly desirable economic advantage.

Other particularly useful esters are those of thien-2-ylacetic acid, thien-3-ylacetic acid, m-hydroxy phenylacetic acid and p-hydroxyphenylacetic acid.

The following examples are provided by way of illustration only. The term phenylglycine as used throughout the examples denotes the compound 2-amino-2-phenylacetic acid, and the term phenylglycinate as used throughout the examples denotes a 2-amino-2-phenylacetoxy group.

EXAMPLE 1

To a mixture of methyl phenylacetate (7.6 g 0.05 mole), isopropyl nitrite (9.8 g 120% mole excess) and petroleum spirit 60°–80°C (50 ml), stirring at 30°C was added a solution of sodium (1.4 g. 0.06 mole) in dry methanol (18 ml) over a period of 5 minutes. Aa thick yellow precipitate developed after 5–10 minutes and this suspension stirred for a total of 16 hours at 30°C.

Solvents were removed by vacuum evaporation at a moderate temperature (<50°C) and the residue dissolved in methanol. The pH was adjusted to 2.0 with sulphuric acid solution ($H_2O$: $c.H_2SO_4$ 2:1) and the precipitated sodium sulphate filtered. The methanolic solution containing the methyl $\alpha$-oximino phenyl glyoxylate was hydrogenated at 40°C at atmospheric pressure using 5% palladium on carbon (10% w/w of oxime present) as a catalyst. After removal of the catalyst the methanol was removed by vacuum evaporation at moderate temperature (<50°C) and the resulting crude methyl phenyl glycinate (7.45 g; 88%) characterised by hydrolysis as follows:

The residue from the hydrogenation was treated with 10% aqueous NaOH (20 ml), the resulting solutuion warmed to 70°C and maintained at that temperature for 30 minutes. After being cooled to 5°C the pH was adjusted to 7.0 with c.HCl and the precipitated phenyl glycine filtered off. The solids were washed by displacement with water and vacuum dried at 38°C to give phenyl glycine (5.8 g. 75.8% m.p. with sublimation 255°C); n.m.r. of hydrochloride in DMSO-$d_6$: 1 proton (CH): 5.085 $\delta$ (s) 5-protons ($C_6H_5$) 7.5 $\delta$ (multiplet); I.r. 2560 (m), 1660 (sh), 1630 (sh), 1610 (sh), 1585 (s), 1520 (m), 1400 (w), 1200 (w).

Comparable results were obtained using ethyl or n-butyl acetate as solvent in the hydrogenation reaction.

EXAMPLE 2

To a mixture of methyl phenylacetate (7.6 g; 0.05 mole), n-butyl nitrite (13.7 g; 0.133 mole), and petroleum spirit 60°–80°C (100 ml) stirring at room temperature was added a solution of sodium (1.4 g; 0.06 mole) in dry methanol (18 ml) over a period of 10 minutes. A thick yellow precipitate developed within 1 hour and this suspension stirred for a total of 70 hours at room temperature.

Solvents were removed by vacuum evaporation at a moderate temperature (<50°C) and the residue dissolved in methanol. The pH was adjusted to 2.0 with sulphuric acid solution ($H_2O$: $cH_2SO_4$ 2:1) and the precipitated sodium sulphate filterd. The methanolic solution containing the methyl $\alpha$-oximino phenylglyoxylate was hydrogenated at 40°C at atmospheric pressure using 5% palladium on carbon (10% w/w of oxime present) as a catalyst. After removal of the catalyst the methanol was removed by vacuum evaporation at moderate temperature (<50°C) and the resulting crude methyl phenylglycinate (6.9 g; 84%) characterised by hydrolysis (as in Example 1) to give phenylglycine (5.4 g; 71.4%) m.p. with sublimation 255°C.

EXAMPLE 3

Sodium (0.7 g; 0.03 mole) was dissolved in refluxing isopropyl alcohol (30 ml.). The final product was a wet crystalline solid, to which was added dropwise with stirring, a mixture of isopropyl phenylacetate (4.45 g; 0.025 moles) and isopropyl nitrite (4.9 g; 0.055 moles) in petroleum ether 60°–80°C (25 ml). The reaction was kept at room temperature and allowed to continue with stirring for 20 hours. No precipitate formed during this stage of the reaction.

Solvents were removed by vacuum evaporation at a moderate temperature (<50°C) and the residue dissolved in methanol. The pH was adjusted to 2.0 with sulphuric acid solution ($H_2O$: $cH_2SO_4$ 2:1) and the precipitated sodium sulphate filtered. The methanolic solution containing isopropyl $\alpha$-oximinophenylglyoxylate was hydrogenated at 40°C at atmospheric pressure using 5% palladium on carbon (10% w/w ov oxime present) as a catalyst. After removal of the catalyst the methanol was removed by vacuum evaporation at moderate temperature (<50°C) and the resulting crude isopropyl phenylglycinate (2.28 g; 47.1%) characterised by hydrolysis as follows:

The residue from the hydrogenation was treated with 10% aqueous NaOH (20 ml), the resulting solution warmed to 70°C and maintained at that temperature for 30 minutes. After being cooled to 5°C the pH was adjusted to 7.0 with cHCl and the precipitated phenyl glycine filtered off. The solids were washed by displacement with water and vacuum dried at 38°C to give phenylglycine (1.52 g: 39.8%) m.p. with sublimation 255°C.

EXAMPLE 4

To a mixture of isopropyl phenylacetate (4.45 g; 0.025 mole), isopropyl nitrite (4.9 g: 0.055 mole) and petroleum spirit 60°–80°C (25 ml) stirring at 30°C was added a solution of sodium (0.7 g. 0.03 mole) in dry methanol (9 ml) over a period of 5 minutes. A thick yellow precipitated developed after 5–10 minutes and this suspension was stirred for a total of 16 hours at 30°C.

The solvents were removed and the hydrogenation carried out according to the procedures described in Example 1 to give crude esters of phenylglycinate (3.0 g: 62.1%) characterised by hydrolysis as described to give phenylglycine (2.0 g: 52.4%) m.p. with sublimation 254°C.

EXAMPLE 5

Sodium (0.7 g: 0.03 mole) was dissolved in refluxing n-butyl alcohol (15 ml). This solution was added with stirring at 40° to a mixture of n-butyl phenylacetate (4.81 g: 0.025 mole) and n-butyl nitrite (7.7 g: 0.075 mole) in petroleum ether 60°–80° (25 mls). The reaction was kept at 40°C and allowed to continue for 18 hours with stirring. A thick yellow precipitate developed during this stage of the reaction.

The solvents were removed and the hydrogenation carried out according to the procedures described to give crude n-butyl phenylglycinate (3.29 g; 63.5%) characterised by hydrolysis as described to give phenylglycine (2.04 g; 53.4%).

EXAMPLE 6

To a mixture of n-butyl phenylacetate (4.81 g; 0.025 mole), n-butyl nitrite (7.7 g; 0.075 mole) and petroleum spirit 60°–80°C (25 mls) being stirred at 40°C was added a solution of sodium (0.7 g; 0.03 mole) in dry methanol (9 ml) over a period of 5 minutes. A thick yellow precipitate developed during the first hour and this suspension was stirred for a total of 18 hours at 40°C.

The solvents were removed and the hydrogenation carried out according to the procedures described above to give crude n-butyl phenylglycinate (3.96 g; 76.4%) characterised by hydrolysis as described to give phenylglycine (2.46g; 64.4%).

EXAMPLE 7

Hydrogenation of Oxime Acid

An oximation reaction was carried out on a 0.05 mole scale using the procedures described in Example 1. Prior to hydrogenation, however, solvents were removed under vacuum and the residue dissolved in 1N sodium hydroxide (100 ml). This solution was warmed to 40°C for 15 minutes cooled and the pH adjusted to 1.5 with 6N hydrochloric acid.

Extraction with ether ($\times$3), drying over magnesium sulphate and removal of solvents afforded a crude mixture of nitrosated acids (7.15g: 86.7%).

A sample of this crude acid mixture (4.0g: 0.024 mols) was dissolved in methanol (200 ml) and hydrogenated in the usual way using 5% Pd/C catalyst (0.4g: 10% addition) according to the procedures described in Example 1. Hydrogenation was complete in 30 minutes. The catalyst and precipitated Dl-2-amino-2-phenylacetic acid were collected by filtration and this residue stirred with 2N hydrochloric acid (50 ml).

After filtration and washing the acidic filtrate was brought to pH 5.0 with ammonia (S.G.O. 88) and cooled to 0°C for 1 hours. The precipitated 2-amino-2-phenylacetic acid was filtered, washed with water ($\times$2), methanol ($\times$2) and dried at 40°C under vacuum.

Yield of 2-amino-2-phenylacetic acid (2.60g: 72.2%)
Overall yield to (DL) Phenylglycine 62.6%

EXAMPLE 8

Starting Material methylthien-2-yl Acetate

Sodium (1.4g: 0.06 mole) was dissolved in dry methanol (10 ml) and added dropwise with stirring to methylthien-2-yl acetate (7.8g: 0.05 mole) and isopropylnitrite (9.8g: 120% mole excess) in petroleum ether 60°–80°C (50 ml) all at 30°C. The solution darkened immediately and the yellow sodium salt separated as a solid within 5 minutes. The reaction was allowed to continue at 30°C for 16 hours after which the solvent was removed, the resultant yellow solid dissolved in methanol and the oxime released by careful addition of sulphuric acid ($H_2SO_4$: $H_2O$ 1:2) to pH 2.0. Filtration removed the precipitated sodium sulphate and the resultant yellow solution was hydrogenated at 40°C, atmospheric pressure, using 5% Pd/C catalyst (0.8g: 10%). The hydrogenation was followed by T.L.C. and proved slow, it was necessary to add excess catalyst. After filtration the hydrogenated solution was divided as follows.

Solvents were removed under vacuum at moderate temperature from one half of the hydrogenated solution to give crude methyl-DL-2-amino-2-thienyl acetate. The crude methyl ester was dissolved in methanol and the solution saturated with dry hydrochloric acid gas to give the crude hydrochloride (3.2g: 62%) recrystallised from methanol/petrol to give methyl-DL-2-amino-2-thien-2-yl-acetate hydrochloride. M.p. 183° (with decomp) characterised by N.M.R. ($D_2O$) and I.R.

| I.R. | 2610(M) | 1745(S) | 1705(SH) | 1585(M) |
|---|---|---|---|---|
|  | 1520(S) | 1260(S) | 1205(S) | 1150(M) |
|  | 1052(W) | 1040(M) | 952(M) | 890(M) |
|  | 855(M) | 720(S) |  |  |
| Analysis: | C 40.84 |  | Cl 16.9 | S 15.3 |
|  |  | 4.94  6.7 |  |  |
|  | 40.48 | 4.82  6.75 | 17.1 | 15.42 |

A quarter sample was hydrolysed by boiling under reflux with 2N sodium hydroxide (25 ml) for 2 hours. When cool the solution was brought to pH 5.0 with conc. hydrochloric acid and the precipitated 2-amino-2-thien-2-yl acetic acid filtered, washed with methanol and dried under vacuum at 35°C.

Yield 2-amino-2-thien-2-yl-acetic acid 1.1g: 56.4% overall characterised by N.M.R. (hydrochloride in $D_2O$) and I.R. M.p. 235°–236°C (Lit. 235°–240°C)

| I.R. | 2670(M) | 1660(S) | 1630(SH) | 1590(S) |  |
|---|---|---|---|---|---|
|  | 1530(M) | 1300(M) | 1255(M) | 1125(M) | 1060(W) |
|  | 1020(W) | 900(M) | 850(M) | 730(M) | 795(S) |

EXAMPLE 9

Starting Material Methyl m-Hydroxyphenyl Acetate

Sodium (1.1g: 0.048 mole) was dissolved in dry methanol (14 ml) and added dropwise with stirring to methyl-hydroxy phenyl acetate (3.3g: 0.02 mole) and isopropylnitrite (4.0g: 120% mole excess) in dry diethyl ether (30 mls) all at room temperature. The reaction was allowed to continue at 20°C for 16 hours after which the solvent was removed, the resultant residue dissolved in methanol and the oxime released by careful addition of sulphuric acid ($H_2SO_4 : H_2O$; 1:2) to pH 2.0 Filtration removed the precipitated sodium sulphate and the resultant solution was hydrogenated according to the procedures described in Example 1.

After filtration solvents were removed under vacuum and the resultant oily residue dissolved in ethyl acetate (50 ml). The solution was saturated with dry hydrochloric acid gas to give methyl 2-amino-2-(3'-hydroxyphenyl) acetate hydrochloride as a pale yellow solid. M.p. 186°–187°C (with decomp) characterised by N.M.R. and I.R.

| I.R. | 3320(S) | 1740(S) | 1620(W) | 1595(S) | 1310(M) |
|---|---|---|---|---|---|
| | 1285(M) | 1250(M) | 1225(M) | 1170(M) | |
| | 1140(M) | 1050(M) | 1005(W) | 970(M) | 940(M) |
| | 895(W) | 780(M) | 745(W) | 695(M) | |

EXAMPLE 10

Use of Diethyl Ether as a Solvent

Sodium (2.75 g; 0.12 mole) was dissolved in dried methanol (35 ml) and the solution added to methyl phenylacetate (15.1g; 0.10 mole) in dry ether (350 ml). This mixture was cooled to 10°C and n-butyl nitrite (22.6; 0.22 mole) added with stirring. A thick yellow precipitate developed after 5–10 minutes and this suspension was stirred for a total of 18 hours at room temperature.

The solvents were removed and the hydrogenation carried out according to the procedure described above to give crude methyl phenylglycinate (10.1g; 60.8%) characterised by formation of the hydrochloride (12.3g; 60.9%) m.p. 216°.

EXAMPLE 11

The Use of Toluene as a Solvent

Sodium (2.75g; 0.12 mole) was dissolved in dried methanol (35 ml) and the solution added to methyl phenylacetate (15.1 g| 0.10 mole) in dry toluene (150 ml). To this mixture at room temperature was added n-butyl nitrite (22.6g; 0.22 mole) with stirring. The reaction mixture was now warmed to 50°C and stirred at this temperature for 2 hours. A thick yellow precipitate formed after 1½ hours.

The solvents were removed and the hydrogenation carried out according to the procedures described above to give crude methyl phenylglycinate (9.8g; 59.2%) characterised by formation of the hydrochloride (12.0g; 59.3%) m.p. 206°C.

EXAMPLE 12

To a mixture of methyl phenylacetate (7.6g; 0.05 mole), methyl nitrite (7.63g; 0.215 mole) and petroleum spirit 60°–80°C (140 ml) being stirred at room temperature was added a solution of sodium (1.4g; 0.06 mole) in dry methanol (18 ml) over a period of 5 minutes. A thick yellow precipitate developed after 30–40 minutes and the suspension was stirred for a total of 20 hours.

Solvents were removed by vacuum evaporation at a moderate temperature (<50°C) and the residue dissolved in ethanol. The pH was adjusted to 2.0 with sulphuric acid solution ($H_2O$: $cH_2SO_4$ 2:1) and the precipitated sodium sulphate filtered off. The ethanolic solution containing methyl α-oximino phenylglyoxylate was hydrogenated at 40°C at atmospheric pressure using 5% palladium on carbon (10% w/w of oxime present) as a catalyst. After removal of the catalyst the ethanol was removed by vacuum evaporation at moderate temperature (<50°C) and the resulting crude methyl phenylglycinate (5.3g; 64.2%) characterised by hydrolysis (Example 1) to give phenylglycine (4.16g; 55.0%).

EXAMPLE 13

Use of Isopropyl Nitrite as a Solvent

To a mixture of methyl phenylacetate (7.6 g., 0.05 mole) and isoporpyl nitrite (30 g., 570 % mole excess) stirring at 30°C, was added a solution of sodium (1.4 g., 0.06 mole) in dry methanol (18 ml.) over a period of 5 mins. A thick yellow precipitate developed after 5–10 mins. and this suspension was stirred for a total of 16 hours at 30°C.

The solvents were removed, the reaction worked up, and the hydrogenation carried out according to the procedures described in Example 1 to give crude esters of DL-2-amino-2 phenylacetic acid (7.4 g., 87.4% calculated as methyl ester) characterised by hydrolysis, as described, to give phenylglycine (5.7 g., 75.4%) m.p. with sublimation 254°C.

Characteristics of esters produced in several of the above Examples are given below: in each case the ester was purified before characterisation. In the infra red (i.r.) spectra (W) = weak; (M) = medium, (S) = strong and (SH) = shoulder.

EXAMPLE 1 n.m.r. 2 PROTONS ($NH_2$) 0.9δ (SINGLET) 3 PROTONS ($CH_3$) 3.6δ (SINGLET) 1 PROTON (CH) 4.6δ (SINGLET) 5 PROTONS ($C_6H_5$) 7.4δ (MULTIPLET).

| i.r. | 3390 (M) | 3070 (M) | 3040 (M) | 2960 (M) |
|---|---|---|---|---|
| | 2850 (W) | 1735 (S) | 1740 (SH) | 1605 (M) |
| | 1495 (M) | 1455 (M) | 1435 (M) | 1265 (M) |
| | 1220 (S) | 1170 (S) | 1070 (W) | 1030 (SH) |
| | 1000 (SH) | 985 (M) | 910 (M) | 870 (M) |
| | 820 (M) | 775 (M) | 730 (M) | 700 (S) |

EXAMPLE 3 n.m.r. 6 PROTONS ($CH_3$)$_2$) 1.1δ (TWIN DOUBLET) 2 PROTONS ($NH_2$) 2.1δ (SINGLET) 1 PROTON (—CH—) 4.5δ (SINGLET) 1 PROTON (—CH—) 5.03δ (SEPTET) 5 PROTONS ($C_6H_5$) 7.35δ (MULTIPLET)

| i.r. | 3380 (M) | 3310 (W) | 3080 (W) | 3060 (W) | |
|---|---|---|---|---|---|
| | 3030 (M) | 2980 (S) | 2930 (M) | 2870 (SH) | |
| | 1730 (S) | 1605 (M) | 1495 (M) | 1470 (SH) | |
| | 1455 (M) | 1375 (S) | 1270 (S) | 1220 (S) | 1175 (S) |
| | 1105 (S) | 1060 (W) | 1005 (W) | 960 (M) | 870 (M) |
| | 830 (M) | 770 (W) | 730 (W) | 695 (S) | |

EXAMPLE 5

| i.r. | 3300 (M) | 2960 (S) | 2940 (SH) | 2880 (M) | |
|---|---|---|---|---|---|
| | 1740 (S) | 1720 (SH) | 1600 (W) | 1500 (W) | |
| | 1460 (SH) | 1450 (SH) | 1440 (M) | 1325 (SH) | |
| | 1310 (M) | 1280 (M) | 1220 (S) | 1110 (W) | 1070 (M) |
| | 1040 (S) | 1025 (S) | 1000 (SH) | 940 (W) | |
| | 840 (W) | 770 (M) | 715 (M) | 690 (S) | |

EXAMPLE 12 (CHARACTERISTICS OF ESTER HYDROCHLORIDE)

n.m.r. 3 PROTONS ($CH_3$) 3.72$\delta$(SINGLET) 1 PROTON (CH) 5.23$\delta$(SINGLET) 5 PROTONS ($C_6H_5$) 7.5$\delta$ (MULTIPLET) 3 PROTONS ($NH_3^+$). Approximately 9.33$\delta$(VERY BROAD).

| i.r. | (NUJOL) | 2030 (W) | 1745 (S) | 1590 (M) | 1580 (M) | |
|---|---|---|---|---|---|---|
| | | 1520 (W) | 1495 (W) | 1350 (M) | 1330 (SH) | |
| | | 1310 (W) | 1300 (W) | 1250 (S) | 1190 (S) | 1140 (M) |
| | | 1070 (W) | 1050 (S) | 1030 (M) | 1000 (W) | |
| | | 955 (M) | 920 (W) | 885 (M) | 780 (M) | 735 (S) |
| | | 695 (S) | | | | |

We claim:

1. An improved process for the production of an ester of a DL-2-amino-2-arylacetic acid having an aryl group containing up to 20 carbon atoms which comprises the steps of:
   a. subjecting the corresponding 2-arylacetic acid ester to nitrosation with an organic nitrosating agent selected from the group consisting of a lower alkyl nitrite, cycloalkyl nitrite, aryl nitrite and aralkyl nitrite in an organic solvent in the presence of a base selected from the group consisting of an alkali metal alkoxide, an alkali metal amide or an alkali metal silylamide and
   b. without separation catalytically reducing the resultant individual nitrosation products by subjecting them to reduction using hydrogen and a noble metal catalyst to form the desired DL-amino-2-arylacetic acid ester.

2. A process according to claim 1 wherein said organic nitrosating agent is formed in situ.

3. A process as claimed in claim 1 in which the base is an alkali metal alkoxide.

4. A process as claimed in claim 1 in which the nitrite is isopropyl or butyl nitrite.

5. A process as claimed in claim 1 in which the nitrosation is effected in the presence of a hydrocarbon solvent and/or an excess of nitrosating agent as reaction medium.

6. A process as claimed in claim 1 in which nitrosation is effected using 1.5 to 3 moles of nitrosating agent per mole or arylacetic ester.

7. A process as claimed in claim 1 in which nitrosation is effected in the presence of a polar protic organic solvent.

8. A process as claimed in claim 7 in which the polar protic organic solvent is a lower alcohol having 1–6 carbon atoms.

9. A process as claimed in claim 1 in which a methyl arylacetic ester is reacted with isopropyl nitrite in the presence of an alkali metal methoxide in methanol.

10. A process as claimed in claim 1 in which the reducing agent is hydrogen with palladium as catalyst.

11. A process as claimed in claim 10 in which the palladium catalyst is supported on carbon.

12. A process as claimed in claim 1 in which reduction is effected in a lower alkanol or an ester as solvent.

13. A process as claimed in claim 1 in which the nitrosated ester products are acidified before reduction.

14. A process as claimed in claim 13 in which acidification is effected under substantially anhydrous conditions.

15. A process as claimed in claim 14 in which acidification is effected using hydrogen chloride gas, concentrated phosphoric acid, sulphuric acid decahydrate, or glacial acetic acid.

16. A process as claimed in claim 1 in which the DL-2-amino-2-arylacetic ester product is subsequently subjected to hydrolysis to yield the corresponding DL-2-amino-2-arylacetic acid.

17. A process as claimed in claim 1 in which the ester possesses as esterifying group an alkyl, cycloalkyl, aryl or aralkyl group.

18. A process as claimed in claim 17 in which the ester group is a lower alkyl ester having 1–6 carbon atoms in the esterifying group.

19. A process as claimed in claim 1 in which the aryl group is a phenyl group.

20. A process as claimed in claim 1 in which the aryl group is a hydroxyphenyl or thienyl group.

21. A process as claimed in claim 20 in which the aryl group is a m-or p-hydroxyphenyl group.

22. A process as claimed in claim 20 in which the aryl group is a thien-2-yl or thien-3-yl group.

23. A process as claimed in claim 1 in which the 2-arylacetic acid ester is methyl 2-phenylacetate.

24. A modification of the process as claimed in claim 1 in which the ester product is hydrolysed after nitrosation, without separation of individual nitrosated products to effect substantially complete conversion to acid, which acid material is then subjected to reduction.

* * * * *